United States Patent [19]

Bacskai

[11] 4,101,447

[45] Jul. 18, 1978

[54] PYRROLIDONE POLYMERIZATION CATALYST SYSTEM

[75] Inventor: Robert Bacskai, Kensington, Calif.

[73] Assignee: Chevron Research Company, San Francisco, Calif.

[21] Appl. No.: 724,801

[22] Filed: Sep. 20, 1976

[51] Int. Cl.$^2$ .................. B01J 31/12; C08G 73/16
[52] U.S. Cl. ..................... 252/431 C; 252/431 N; 528/315; 528/323
[58] Field of Search ............. 252/431 C, 431 N; 260/78 P

[56] References Cited

U.S. PATENT DOCUMENTS

| | | | |
|---|---|---|---|
| 2,973,343 | 2/1961 | Ney, Jr. | 260/78 P |
| 3,681,293 | 8/1972 | Jarovitzky et al. | 260/78 P |
| 3,681,294 | 8/1972 | Jarovitzky | 260/78 P |
| 3,682,869 | 8/1972 | Jarovitzky | 260/78 P |
| 3,683,046 | 8/1972 | Jarovitzky | 260/78 P X |
| 3,721,652 | 3/1973 | Barnes | 260/78 P |
| 3,745,152 | 7/1973 | Ciaperoni et al. | 260/78 P |
| 3,835,100 | 9/1974 | Sekiguchi et al. | 260/78 P |
| 3,875,121 | 4/1975 | Brassat et al. | 260/78 P X |
| 3,935,171 | 1/1976 | Ciaperoni et al. | 260/78 P |

FOREIGN PATENT DOCUMENTS 4,726,195   1972   Japan.

*Primary Examiner*—Patrick P. Garvin
*Assistant Examiner*—William G. Wright
*Attorney, Agent, or Firm*—Dix A. Newell; Thomas G. DeJonghe; Lawrence S. Squires

[57] ABSTRACT

The process of making a catalyst for the polymerization of 2-pyrrolidone by contacting an alkali metal pyrrolidonate, a quaternary ammonium carboxylate and carbon dioxide.

8 Claims, No Drawings

PYRROLIDONE POLYMERIZATION CATALYST SYSTEM

BACKGROUND OF THE INVENTION

Poly-2-pyrrolidone is produced by the alkaline-catalyzed polymerization of 2-pyrrolidone. The catalyst system may comprise a partially carbonated pyrrolidonate salt made, for example, by reacting an alkali metal hydroxide with 2-pyrrolidone, or by reacting a quaternary ammonium hydroxide with 2-pyrrolidone, dehydrating, and contacting the product with carbon dioxide (U.S. Pat. No. 3,721,652). Japanese Pat. No. 47-26195 discloses a process for making a catalyst by reacting a nonwater-forming alkali metal compound with 2-pyrrolidone and contacting the product with a quaternary ammonium halide under anhydrous conditions. For many purposes, it is advantageous to be able to rapidly produce poly-2-pyrrolidone having high molecular weight, e.g. in excess of 500,000, in good yield.

BRIEF SUMMARY OF THE INVENTION

A catalyst, capable of producing a high molecular weight poly-2-pyrrolidone is made by contacting an alkali metal pyrrolidonate, certain quarternary ammonium carboxylates and carbon dioxide.

DESCRIPTION OF PREFERRED EMBODIMENTS

The catalyst of the present invention is capable of producing poly-2-pyrrolidone of weight average molecular weight in excess of 500,000. The present catalyst also achieves high yields and high conversion rates without diminution of molecular weight. The catalyst does not require an anhydrous source of alkali metal pyrrolidonate and it is preferred to certain other onium salt catalysts for its solubility in the 2-pyrrolidone polymerizate.

Catalyst System

In the process of the present invention a catalyst for the polymerization of 2-pyrrolidone is made by contacting an alkali metal pyrrolidonate, certain quaternary ammonium carboxylates and carbon dioxide in mol ratio of about 1:0.1-2:0. 1-0.5, preferably in mol ratio of about 1:0.2-1.5:0.1-0.5, and most preferably in a mol ratio of about 1:1:0.3.

The reactants, i.e. the pyrrolidonate, the ammonium carboxylate and the carbon dioxide, may be contacted in any order beginning with the pyrrolidonate as one of the components. It is preferred, but not necessary, to add the quaternary ammonium carboxylate to the previously carbonated pyrrolidonate salt. In a preferred embodiment, the catalyst of the present invention is formed in a solution of 2-pyrrolidone. An alkali metal hydroxide is added to an excess of 2-pyrrolidone, with which it reacts to produce a solution of the alkali metal pyrrolidonate and water in 2-pyrrolidone. The solution is dehydrated until it contains less than about 0.1-0.2 weight percent water. Then carbon dioxide is added in the desired mol ratio to the pyrrolidonate in the solution at a temperature of about 25°-30° C. The quaternary ammonium carboxylate is also added in the desired mol ratio to the pyrrolidonate at about the same temperature.

The preferred quaternary ammonium carboxylate of the present invention is a lower alkyl tetraalkyl ammonium carboxylate of a lower alkanoic acid. The tetraalkyl ammonium carboxylate may be produced by the neutralization of the carboxylic acid with a tetraalkyl ammonium hydroxide. The tetraalkyl ammonium carboxylate is preferably a tetra ($C_1$-$C_6$) alkyl ammonium carboxylate, and more preferably a tetra ($C_1$-$C_3$) alkyl ammonium carboxylate. Representative alkyl groups include methyl, ethyl, propyl, isopropyl, butyl, isobutyl, t-butyl, hexyl, etc. The carboxylate is preferably the alkanoate of a $C_1$-$C_6$ alkanoic acid, more preferably a $C_1$-$C_3$ alkanoic acid and most preferably, the acetate. Representative tetraalkyl ammonium carboxylates include tetramethyl ammonium acetate, tetraethyl ammonium acetate, dimethyldiethyl ammonium propionate, etc. The ammonium carboxylate may be used as a combination of species, e.g. as a mixture of tetramethyl ammonium acetate and tetraethyl ammonium acetate. However, the ammonium carboxylate should be substantially soluble under the alkaline conditions of catalyst system preparation and polymerization in order to show an appreciable effect on the polymerization reaction. In this regard, tetramethyl ammonium acetate shows a considerable advantage over the corresponding halide, tetramethyl ammonium chloride, since it is much more soluble in the polymerizate.

The alkali metal pyrrolidonate is preferably sodium or potassium pyrrolidonate. For certain purposes, it may be advantageous to substitute for pyrrolidonate in whole or in part an alkali metal caprolactamate or the alkali metal salt of another low-molecular-weight lactam, but this is normally not preferred to the use of the pyrrolidonate. The alkali metal pyrrolidonate is preferably made by contacting the alkali metal hydroxide with excess 2-pyrrolidone, but other methods may be chosen, such as by reacting 2-pyrrolidone with an alkali metal or an alkali metal alkoxide. While it is preferable to contact the tetraalkyl ammonium carboxylate, the pyrrolidonate and carbon dioxide in a 2-pyrrolidone solution, inert solvents may be used in whole or in part to replace the 2-pyrrolidone. Sulfur dioxide is believed to be a partial substitute for carbon dioxide, and its use is not barred in the practice of the present invention.

In the catalyst system of the present invention, polymerization initiators and polymerization accelerators may also be used. Unexpectedly rapid polymerization to poly-2-pyrrolidone of satisfactorily high molecular weight is achieved in this catalyst system by the addition of 0.05-1.5 mol percent of acetic anhydride. Preferably 0.05-1.0 and most preferably about 0.05-0.5 mol percent of acetic anhydride is used. Suitable accelerators are also described in U.S. Pat. No. 3,721,652 and include N-acyl lactam, particularly the N-acyl pyrrolidones, preferably N-acetyl pyrrolidone. 1-(1-pyrrolin-2-yl)-2-pyrrolidone is a particularly preferred activator.

Polymerization Conditions

The polymerization process of this invention is specifically applicable to the polymerization of 2-pyrrolidone to form a polymeric carbonamide of high molecular weight in a reasonably short polymerization time, for this reaction, of 4-24 hours. The high-molecular-weight polymer is capable of being formed into filaments having substantial orientation along the filamentary axis, high tensile strength and other properties suitable for making into textiles. It can be made into shaped articles and film by melt-molding or extrusion.

In order to produce high-quality poly-2-pyrrolidone capable of being formed into fibers, filaments and yarn of commercial textile quality, it is necessary that the 2-pyrrolidone be of high purity. Depending upon the process of manufacture, commercially available 2-pyrrolidone may contain appreciable amounts of various impurities, some of which are believed to interfere deleteriously with polymerization. Purification of the monomer to polymerization grade is achieved by known purification techniques, including distillation.

The process of the present invention is applicable to the production of polymers of C-alkyl-substituted pyrrolidone, such as 4-methyl-2-pyrrolidone and copolymers of 2-pyrrolidone, such as with caprolactam, as well as to the production of poly-2-pyrrolidone. Consequently, in general, and unless otherwise indicated, "monomer" denotes 2-pyrrolidone, substituted 2-pyrrolidone, and any compound capable of copolymerizing with 2-pyrrolidone under the stated conditions of alkaline polymerization catalysis.

Preferably, the catalyst system comprises about 0.5–30 mol percent or more of the 2-pyrrolidone-catalyst mixture, based on total 2-pyrrolidone, more preferably about 5–20 mol percent, and most preferably about 10 mol percent catalyst. Total 2-pyrrolidone consists of 2-pyrrolidonate catalyst, including alkali metal pyrrolidonate and quaternary ammonium pyrrolidonate, as well as carbonated alkali metal pyrrolidone and carbonated quaternary ammonium pyrrolidonate, and 2-pyrrolidone provided as solvent to said catalyst, and any additional monomer charged to the mixture for polymerization reaction. The polymerization catalyst system is believed to principally comprise quaternary ammonium pyrrolidonate and carbonated quaternary ammonium pyrrolidonate, but substantial amounts of alkali metal pyrrolidonate and carbonated alkali metal pyrrolidonate (carboxypyrrolidonate) may also be present, depending upon the mol ratios chosen. Alkali metal carboxylate is thought to be present, but it is believed to be inert towards the polymerization reaction.

In general, 2-pyrrolidone may be polymerized at a temperature from about 15° C to about 100° C, preferably 25° C to 70° C, and most preferably from about 40° C to about 60° C, under a pressure ranging from subatmospheric to superatmospheric, in the presence of the catalyst system for a period from about 4 to about 100 hours or longer, preferably for about 8 to about 72 hours, and most preferably from about 8 to about 48 hours. In continuous operation, polymerization time refers to average residence under polymerization conditions. A small amount of water, not exceeding about 0.1-0.2 weight percent, based on total 2-pyrrolidone, is permissible in the reaction mixture, but less than 0.1 weight percent is preferred.

Preparation of polymers of 2-pyrrolidone, according to the normal process of this invention, can be carried out with various amounts of monomers, catalyst, inert nonsolvent liquids, initiators and other additives -- the amount of each being properly coordinated to produce the most effective polymerization - with or without stirred reactors, by bulk polymerization, solution polymerization, or otherwise, continuously or batchwise. Although the preferred conditions and amounts of the components in the reaction have been given, it is understood that these are not intended to be limitations to polymerization, since it may be possible to achieve substantial polymerization outside the preferred ranges.

EXEMPLIFICATION

Example 1

200 g of purified 2-pyrrolidone (2.3 mols) was contacted with 7.7 g of KOH pellets (0.117 mol, 85.5% KOH) in a stirred reactor vessel and the mixture heated to incipient distillation under reduced pressure at a temperature of about 115° C. The mixture was cooled and a calibrated amount of carbon dioxide was introduced to produce a polymerizate containing 30 mol percent carbon dioxide based on potassium. About 10 g of the polymerizate was poured into each of several successive polyethylene bottles, three of which contained 6 millimols of the dried onium salts shown in Table I. The bottles were shaken well and held at 50° C for 22 hours. The polymer was then removed, washed, dried and weighed. The molecular weight was determined as described elsewhere. The results are given in Table I.

Example 2

The process of the present invention was tested in another example otherwise duplicative of Example 1. 50 g of purified 2-pyrrolidone was contacted with 1.93 g of KOH pellets (85.5% KOH) in a stirred reaction vessel and the mixture was heated to incipient distillation under reduced pressure at a temperature of about 110° C. The mixture was cooled and a calibrated amount of carbon dioxide was introduced to produce a polymerizate comprising 30 mol percent carbon dioxide based on potassium. 1.5 millimols of the previously dried tetramethylammonium acetate was weighed into a polyethylene bottle and 10 g of polymerizate was added to it. The bottle was shaken well and polymerized at 50° C for 22 hours. The product was worked up as described in Example 1. The results are given in Table I.

TABLE I

Comparative Polymerization Results[1]

| | Onium Salt | Mol Ratio K/Onium Salt | Percent Conversion | $M_w \times 10^{-3}$ |
|---|---|---|---|---|
| Example 1 | None | — | 37 | 405 |
| Example 2 | $(CH_3)_4N + OCOCH_3$— | 1.2 | 56 | 720 |
| Example 1 | $(CH_3)_4N + ClO_4$— | 1 | 31 | 400 |
| Example 1 | $(CH_3)_4N + BF_4$— | 1.1 | 35 | 415 |
| Example 1 | $(CH_3)_4N + PF_6$— | 1 | 33 | 405 |

[1] 5 mol percent potassium pyrrolidonate from KOH. 30 mol percent $CO_2$ based on K. Polymerized 22 hours at 50° C.

Table I shows comparative polymerizations in the presence of potassium pyrrolidonate and carbon dioxide with and without tetramethyl ammonium acetate. The tetraalkyl ammonium carboxylate in combination with carbon dioxide and potassium pyrrolidonate is found to be capable of producing polypyrrolidone of extremely high weight average molecular weight. All molecular weights are reported as the weight average molecular weight determined from the specific viscosity of 0.1 gram of polymer/100 cc of m-cresol solution at 25° C. All reported percentages are mol percent unless otherwise indicated. Percent conversion is calculated as 100 × (weight of polymer)/(weight of total 2-pyrrolidone) and total 2-pyrrolidone has been heretofore defined.

What is claimed is:

1. A process for making catalysts for the polymerization of 2-pyrrolidone which comprises contacting an alkali metal pyrrolidonate, a tetraalkyl ammonium alkanoate and carbon dioxide in mol ratios of about 1:1.1-2:0.1-0.5.

2. A process for making catalysts for the polymerization of 2-pyrrolidone which comprises contacting an alkali metal pyrrolidonate, a quaternary ammonium alkanoate and carbon dioxide in mol ratio of about 1:0.1-2:0.1-0.5.

3. The process according to claim 1 wherein said tetraalkyl ammonium alkanoate is tetramethyl ammonium acetate.

4. The process according to claim 1 wherein said alkali metal pyrrolidonate is potassium pyrrolidonate.

5. The process according to claim 2 wherein said mol ratio is about 1:1:0.3.

6. The process according to claim 1 wherein said tetraalkyl ammonium alkanoate is tetra ($C_1$-$C_6$) alkyl ammonium alkanoate.

7. The process according to claim 1 wherein said tetraalkyl ammonium alkanoate is a formate, acetate or propionate.

8. The process of claim 1 wherein said tetraalkyl ammonium alkanoate is a tetraalkyl ammonium ($C_1$-$C_6$) alkanoate.

* * * * *